Feb. 5, 1935.   A. PAGE   1,990,417
MAXIMUM DEMAND METER
Filed Oct. 2, 1934
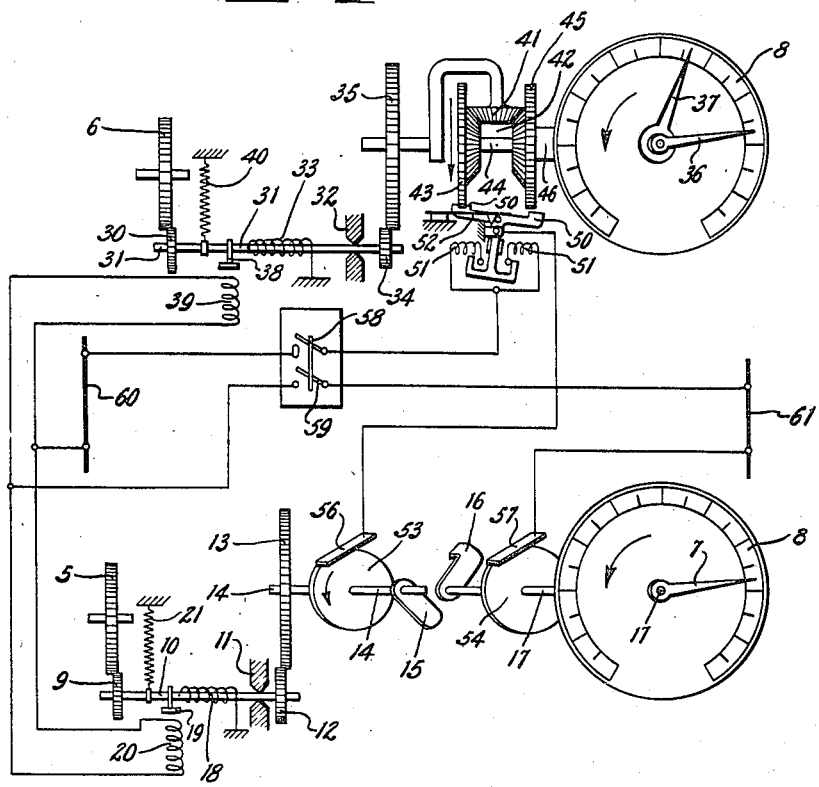
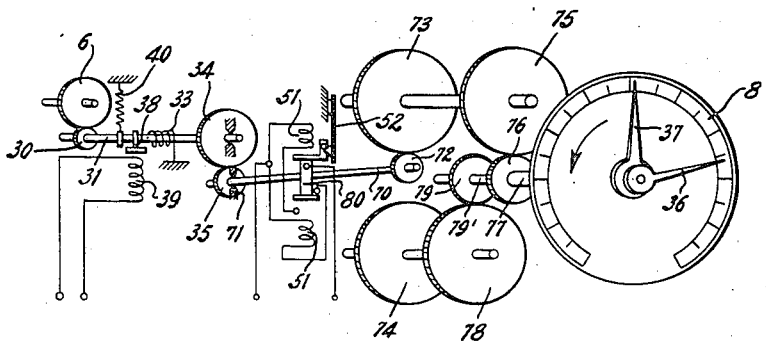
INVENTOR.
Albert Page
BY
Morgan Finnegan and Durham
ATTORNEYS.

Patented Feb. 5, 1935

1,990,417

UNITED STATES PATENT OFFICE 1,990,417

MAXIMUM DEMAND METER

Albert Page, Streatham Park, London, England, assignor to Landis & Gyr, A.-G., a corporation of Switzerland Application October 2, 1934, Serial No. 746,517
In Great Britain September 13, 1933

4 Claims. (Cl. 171—34)

The present invention relates to maximum demand meters and more particularly to a novel and improved maximum demand meter adapted to indicate the power factor of the load.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Of the drawing:

Figure 1 is a diagrammatic view showing an illustrative embodiment of the invention; and Figure 2 is a diagrammatic view showing a modified embodiment of certain portions of the device shown in Fig. 1.

The present invention has for its object the provision of a novel and improved maximum demand meter and method adapted to indicate the true maximum demand and the maximum demand for reactive or wattless component. Another object is the provision of a novel and improved maximum demand meter which will register the data from which the power factor can be determined. Still another object is the provision of a demand meter which is simple and reliable in its operation, and is relatively inexpensive.

In the measurement of electrical energy consumed, for the purpose of determining the rate to be charged the consumer, it is frequently necessary to take into account the power factor of the load on the consumer's circuit, and frequently the rates are based in part upon the power factor of the load. In order to determine this, it is necessary not only to determine the true energy consumed, but it is also necessary to determine the mean power factor. In making these determinations it is generally the practice to use two recording periodic demand meters, one of these measuring the true demand in kilowatts, while the other meter measures the reactive demand in reactive kilovoltamperes. From these two values, the power factor of the load is easily determined.

Such instruments as have heretofore been used for this purpose present the disadvantage that they require the use of two recording instruments and are necessarily too expensive for extensive use, whereas the present invention provides a simple and inexpensive device.

In accordance with the illustrative embodiment of the present invention, there are provided two demand meters, one for measuring the true demand while the other is adapted to measure the reactive component. An indicator is provided for the true maximum demand meter and is adapted to be advanced each time that the previous maximum demand is exceeded, and two alternately operating indicators are provided for similarly showing the maximum reactive component demand during the period in which the maximum demand was registered. Means are also provided for shifting from one of the two reactive demand indicators to the other whenever a new maximum true demand is registered, and for registering the maximum reactive demand on that indicator until another shift is accomplished.

It will be understood that the foregoing general description and the following detailed description as well are examplary and explanatory of the invention but are not restricted thereon.

Referring now in detail to the illustrative embodiment of the present invention as shown in the accompanying drawing, there are provided two demand meters of conventional construction and having driving gears 5 and 6 driven proportionally to the demand. Inasmuch as these meters may be of any suitable construction they are not shown except for their driving gears 5 and 6. The gear 5 is a portion of the meter for measuring the true periodic demand, while the gear 6 is a similar portion of the meter for measuring the periodic demand for the reactive component.

An indicator, comprising the hand 7 and dial 8, is provided for showing the value of the maximum periodic demand as measured in kilowatts or other units of power, and this indicator is driven from the meter gear 5, as follows:

Gear 5 meshes with a gear 9 mounted on shaft 10 which is oscillatably pivoted in its bearing 11 and carries on its other end a pinion 12 meshing with a gear 13 mounted on a shaft 14. On shaft 14 is mounted an arm 15 which is adapted to engage the abutment arm 16 on the coaxial shaft 17 which supports the hand 7. As the arm 15 is driven (counterclockwise) by the meter gear 5, and proportionally to power consumption during the period of measurement, the arm 16 is advanced to move the hand 7 counterclockwise. After the first period, of course, the hand 7 is advanced only in case the power consumption exceeds that of all previous periods.

Means are provided for resetting the demand mechanism, but not the indicator hand 7, at the end of each metering period, and for this purpose spring 18 is coiled about shaft 10 having one end fixed to the shaft 10 and its other end fixed to a stationary part of the device, and being wound by the running of the meter gear 5. An armature 19 is also mounted on shaft 10 and cooperates with its magnet 20 so that on energization of the magnet the shaft 10 is pulled downwardly against the tension of spring 21 to release the gears 5 and 9 and permit spring 18 to return the shaft 10, gears 12 and 13 and arm 15 to their initial positions.

The reactive component maximum periodic demand meter also comprises a somewhat similar mechanism and includes the meter driven gear 6 which is normally meshed with a pinion 30 on shaft 31, this shaft being rotatably and oscillatably mounted in its bearings 32 and held in meshing position by means of the tension spring 40. At its other end shaft 31 carries a gear 34 which meshes with gear 35 serving to drive one or the other of the reactive component maximum periodic demand indicating hands 36 or 37. Shaft 31, like shaft 10, is provided with a releasing armature 38 cooperating with its magnet 39, and is returned to its initial position by means of the spring 33 coiled about the shaft and fixed thereto at one end, while the other end of the spring is fixed to a stationary part of the device.

The indicating hands 36 and 37 are adapted to be alternately driven from gear 35, and for this purpose gear 35 is fixed to the planetary pinion 41 of a differential 42, while the differential gear 43 is fixed to shaft 44 on which hand 36 is supported and differential gear 45 is fixed to a sleeve 46 which is connected to hand 37.

Means are provided for holding one or the other of the gears 43, 45, against rotation during the registering periods, so that only one of the indicating hands 36 and 37 is actuated at a time, and other means are provided for shifting the actuation from one hand to the other each time that the indicating hand 7 indicates a new maximum demand for power. As embodied, there is provided an electromagnetically actuated stop 50 which is pivoted intermediate the gears 43 and 45 and is adapted to contact with one or the other of these gears and prevent its rotation. On either side of the stop 50 is an operating magnet 51 adapted to shift the stop from one gear to the other, while the spring device 52 holds the stop in the position to which it is moved. Thus when the stop 50 is engaging with gear 43, the reactive demand meter drives the hand 37, while when stop 50 engages the gear 45, the meter drives hand 36.

For energizing one or the other of magnets 51 only when a new true maximum demand has been established, a conducting ring 53 is mounted on shaft 14 and contacts with brush 56, while a similar ring 54 is fixed to shaft 17 and contacts with a brush 57, and arms 15 and 16 are also conducting so that current may flow from brush 57 to brush 56 only when the arms 15 and 16 are in contact. Brush 56 is connected to the stop armature 50, while the lower ends of the armature are formed with contacts adapted to complete a circuit with the terminals of one or the other of the magnets 51, thus energizing the appropriate magnet to shift the armature to its other position. The other terminals of these magnets are connected through a common conductor to a switch 58 which is periodically closed by suitable clock actuated mechanism, so as to supply power from the mains 60, 61.

Switch 59 includes a pair of contacts which are in series with the coils of magnets 20 and 39, so that as these contacts are closed magnets 20 and 39 are energized to permit springs 18 and 33 to return their shafts to their initial position preparatory to the registration of the demand during the next period.

So as to provide for shifting of the stop armature 50 prior to the return of the shaft 31 and the resetting of hand 36 or 37, the stationary contact of the switch 58 controlling the magnets 51 is so positioned as to be closed in advance of the closing of the switch 59 controlling the magnets 20 and 39.

The operation of the illustrative embodiment of the present invention will be apparent from the description of the mechanism but may be summarized, as follows:

The true maximum demand meter drives the indicating hand to position it in accordance with the periodic demand during the period of measurement. At the end of each period the mechanism, but not the hand, is reset, while the hand remains at rest until the previous maximum demand has been exceeded, at which time the hand is advanced to indicate the new maximum.

During each period, the reactive demand meter similarly actuates either the hand 36 or the hand 37 to indicate the reactive demand during that period. Stop 50 holds first one hand, then the other against movement, but is shifted from one hand to the other each time a new true maximum periodic demand is established. One or the other of hands 36 and 37 is reset after each period. If 36 is the hand which has just been advanced and it has not passed hand 37, then 36 will be returned to its original position, hand 37 remaining stationary to show the maximum reactive demand, while hand 7 shows the true maximum demand. At the end of each period, hand 7 indicates the true maximum demand during the period of greatest demand; the furthest advanced one of hands 36 and 37 indicates the maximum reactive demand during the period of greatest true demand, while the other of hands 36 and 37 indicates the reactive demand during the period just terminated.

Referring now to the modified embodiment shown in Figure 2 of the drawing, the portion of the mechanism relating to the true maximum demand load has been omitted as this may be identical with that shown in Figure 1. The reactive periodic maximum demand indicating mechanism is adapted to operate in much the same manner as that of Figure 1, but instead of employing a differential, a shiftable pinion is used which may be moved into engagement with either of the gear trains for driving the two hands. In Figures 1 and 2, similar parts are designated by similar reference numerals.

In this embodiment, gear 34 drives gear 35 which is carried on its shaft 70 and is mounted for rotation and oscillation in bearings 71, and carries at its other end a pinion 72 to mesh with either gear 73 or gear 74. Gear 73 is adapted to drive hand 37 through gears 75, 76 and sleeve 77, while the gear 74 is adapted to drive hand 36 through gears 78, 79 and shaft 79'.

For shifting the pinion 72 from engagement with gear 73 to engagement with gear 74, an armature 80 is mounted for reciprocation between and by the magnets 51, and reciprocation of the armature effects the necessary connection with the terminals of the magnets 51 and also shifts the pinion 72. A spring device 52 is provided for holding the pinion 72 in engagement with either of its gears 73 or 74.

The invention in its broader aspects is not limited to the specific mechanisms shown and described but departures may be made therefrom within the scope of the accompanying claims without departing from the principles of the invention and without sacrificing its chief advantages.

What I claim is:

1. A maximum demand meter including in combination a periodic demand meter, a periodic reactive demand meter, an indicator moved by the first demand meter for showing the maximum demand, a pair of indicators to be alternatively actuated by the reactive demand meter, and means for shifting the drive from one to the other of said reactive demand indicators each time a new periodic maximum demand is established.

2. A maximum demand meter including in combination a periodic demand meter, a periodic reactive demand meter, an indicator moved by the first demand meter for showing the maximum demand, a pair of demand indicators alternatively driven by the reactive demand meter, means for shifting the drive from one to the other of said reactive demand indicators each time a new periodic maximum demand is established, and means for returning the meters to their original position at the end of each period.

3. A maximum demand meter including in combination a periodic demand meter, a periodic reactive demand meter, an indicator moved by the first demand meter for showing the maximum demand, a pair of reactive demand indicators, a differential through which said pair of indicators are alternatively driven by the reactive demand meter, means for for alternatively stopping one or the other of the differential gears, means for shifting the stop from one differential gear to the other each time a new true periodic maximum demand is established, and means for periodically resetting the demand meters.

4. A maximum demand meter including in combination a periodic demand meter, a periodic reactive demand meter, an indicator moved by the first demand meter for showing the maximum demand, a pair of reactive demand indicators, a gear for each of said pair of indicators, a pinion alternatively engageable with said gears and driven by the reactive demand meter, means for shifting the pinion from one gear to the other each time a new true periodic maximum demand is established and means for periodically resetting the demand meters.

ALBERT PAGE.